(12) United States Patent
Fourcand

(10) Patent No.: US 8,547,864 B2
(45) Date of Patent: Oct. 1, 2013

(54) LAYER ONE PATH DELAY COMPENSATION

(75) Inventor: Serge Francois Fourcand, Fairview, TX (US)

(73) Assignee: Futurewei Technologies, Inc., Plano, TX (US)

( * ) Notice: Subject to any disclaimer, the term of this patent is extended or adjusted under 35 U.S.C. 154(b) by 295 days.

(21) Appl. No.: 12/910,387

(22) Filed: Oct. 22, 2010

(65) Prior Publication Data

US 2012/0099854 A1 Apr. 26, 2012

(51) Int. Cl.
*H04L 12/26* (2006.01)
(52) U.S. Cl.
USPC .......................................... 370/252
(58) Field of Classification Search
USPC .......................... 370/252, 248, 249
See application file for complete search history.

(56) References Cited

U.S. PATENT DOCUMENTS

| | | | | |
|---|---|---|---|---|
| 5,377,329 A | * | 12/1994 | Seitz | 710/54 |
| 6,097,699 A | * | 8/2000 | Chen et al. | 370/231 |
| 6,430,160 B1 | * | 8/2002 | Smith et al. | 370/252 |
| 6,766,309 B1 | * | 7/2004 | Cheng et al. | 706/3 |
| 7,359,401 B2 | * | 4/2008 | Osawa et al. | 370/462 |
| 7,921,212 B2 | * | 4/2011 | Li et al. | 709/226 |
| 8,018,972 B2 | * | 9/2011 | Roberts et al. | 370/507 |
| 8,265,071 B2 | * | 9/2012 | Sindhu et al. | 370/388 |
| 2008/0212480 A1 | | 9/2008 | Shimonishi | |
| 2009/0245784 A1 | * | 10/2009 | Wang | 398/25 |
| 2009/0263122 A1 | * | 10/2009 | Helkey et al. | 398/7 |

FOREIGN PATENT DOCUMENTS

EP 1936867 A1 6/2008

OTHER PUBLICATIONS

Foreign Communication From a Counterpart Application, PCT Application PCT/CN2011/080068, International Search Report, dated Jan. 5, 2012, 3 pages.
Foreign Communication From A Counterpart Application, European Application No. 11833804.5, Extended European Search Report dated Jul. 13, 2012, 8 pages.
Foreign Communication From A Counterpart Application, PCT Application No. PCT/CN2011/080068, Written Opinion dated Jan. 5, 2012, 3 pages.
Fouli, K., et al., "Optical Coding for Enhanced Real-Time Dynamic Bandwidth Allocation in Passive Optical Networks," Journal of Lightwave Technology, IEEE, Service Center, New York, NY, vol. 27, No. 23, XP011275800, Dec. 1, 2009, pp. 5376-5384.
Choi, J., et al., "One-Way Delay Estimation and Its Application," Computer Communications, Elsevier Science Publishers BV, Amsterdam, NL, vol. 28, No. 7, XP025273361, May 2, 2005, pp. 819-828.

* cited by examiner

*Primary Examiner* — Mark Rinehart
*Assistant Examiner* — Mohammad Anwar
(74) *Attorney, Agent, or Firm* — Conley Rose, P.C.; Grant Rodolph; Rayhao Chung

(57) ABSTRACT

A network component comprising a forwarding physical layer (PHY) unit comprising a source queue (SQ), wherein the forwarding PHY unit is configured to measure a one-way physical layer delay between the forwarding PHY unit and a destination node. Also disclosed is a network component comprising a forwarding PHY unit configured to send a plurality of symbols at a network physical layer to a destination node and receive the symbols at a network physical layer from the destination node, and a SQ configured to queue the symbols returned from the destination node, wherein the forwarding PHY unit is further configured to process the queued symbols to calculate a half round-trip delay based on a virtual delay time.

20 Claims, 4 Drawing Sheets

LAYER ONE PATH DELAY COMPENSATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet comprises a family of frame-based computer networking technologies for local area networks (LANs), and defines a number of wiring and signaling standards for the Physical Layer of the Open Systems Interconnection (OSI) networking model and a common addressing format and Media Access Control (MAC) at the Data Link Layer. Ethernet is flexible in that it allows variable-sized data packets to be transported across different types of mediums using various nodes each having different transmission speeds.

Synchronous Optical Networking (SONET) and Synchronous Digital Hierarchy (SDH) are standardized multiplexing protocols that transfer multiple digital bit streams over optical fibers or electrical interfaces. Due to SONET/SDH protocol neutrality and transport-oriented features, SONET/SDH is used for transporting substantially large amounts of telephone calls and data traffic over the same fiber or wire without synchronization problems. SONET/SDH network transmission standards are based on time-division multiplexing (TDM). TDM is a technology where two or more signals or bit streams are apparently transferred simultaneously as sub-channels in one communication channel but physically take turns on the channel. This is achieved by dividing the time domain into a plurality of recurrent timeslots, e.g. of about same length, one for each sub-channel. As such, one TDM frame corresponds to one timeslot per sub-channel. In networks that use SONET/SDH and/or TDM, such as some Ethernet networks, the nodes synchronize their transmissions by exchanging a plurality of time references.

SUMMARY

In one aspect, the disclosure includes a network component comprising a forwarding physical layer (PHY) unit comprising a source queue (SQ), wherein the forwarding PHY unit is configured to measure a one-way physical layer delay between the forwarding PHY unit and a destination node.

In another aspect, the disclosure includes a network component comprising a forwarding PHY unit configured to send a plurality of symbols at a network physical layer to a destination node and receive the symbols at a network physical layer from the destination node, and a SQ configured to queue the symbols returned from the destination node, wherein the forwarding PHY unit is further configured to process the queued symbols to calculate a half round-trip delay based on a virtual delay time.

In a third aspect, the disclosure includes a method comprising receiving a plurality of layer one symbols from a source node that introduces a virtual delay time from the source node, returning the received symbols to the source node, and receiving a half round-trip delay indication from the source node that is equal to about the virtual delay time.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein is a system and method for transfer delay compensation between network nodes, such as Ethernet nodes. The transfer delay compensation method may be implemented at the physical network layer or OSI layer one (Layer 1) to support transmissions synchronizations between a source node and a destination node. The transfer delay compensation method may be used to compensate for symmetrical span delays or asymmetrical span delays between the two nodes, for instance as part of a network timing and distribution scheme for a geographically distributed network. The source node may exchange with the destination node a plurality of symbols and an internal delay of the destination node in a loop-back sequence to account for symmetrical span delays between the nodes, e.g. about equal time delays in the forward and return paths.

Alternatively, the source node may exchange and queue with the destination node a quantity of symbols (and the internal delay of the destination node) in a loop-back sequence to account for asymmetrical span delays between the nodes, e.g. different time delays in the forward and return directions. The symbols may be exchanged and queued to introduce a virtual delay that may correspond to a maximum expected half round-trip delay between the two nodes. The symbols may be queued in the source node or the destination node, or in both the source node and the destination node using about equal or different size queues. Since the virtual delay exceeds any expected transfer delay or variable span delay in either direction between the two nodes, the symbol forwarding scheme may account for any actual transfer delay in either direction and guarantee substantially equal half round-trip delays between the two nodes. This transfer delay compensation method may be used to improve the distribution and synchronization of network timing frequency and/or phase information, e.g. in term of accuracy.

Figure 1:
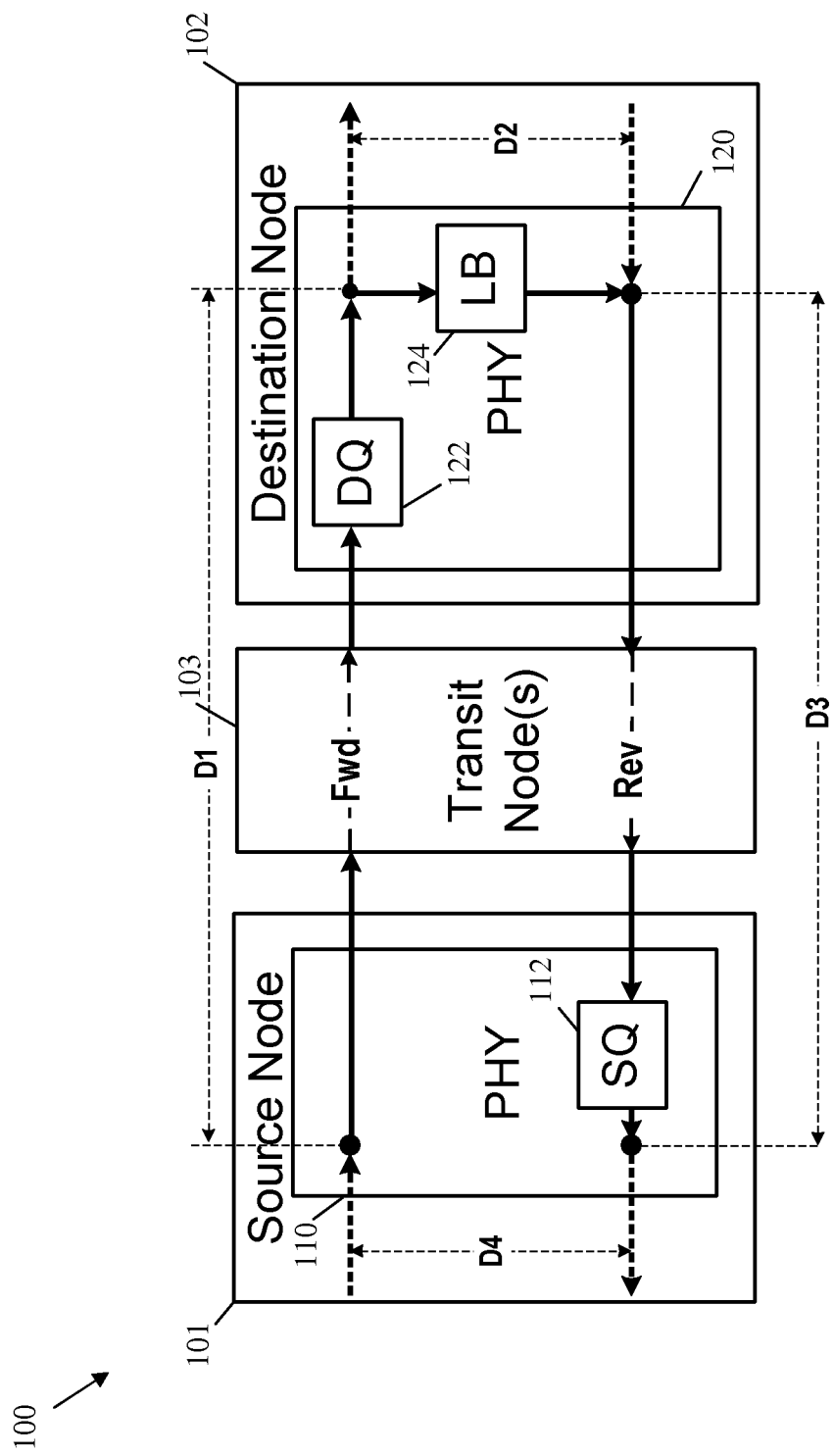
FIG. 1 is a schematic diagram of an embodiment of a transfer delay compensation system.

FIG. 1 illustrates an embodiment of a transfer delay compensation system 100, which may be implemented at network Layer 1 to improve network time distribution and synchronization. For example, the symbol forwarding system 100 may be implemented in Ethernet networks, TDM based networks, LANs, Passive Optical Networks (PONs), Digital Subscriber Line (DSL) systems, or any geographically deployed networks that require transmissions synchronization. The transfer delay compensation system 100 may comprise a source node 101, a destination node 102, and optionally at least one intermediate transit node 103 that may be positioned between the source node 101 and the destination node 102. In another embodiment, the transfer delay compensation system 100 may not comprise the transit node 103 and the source node 101 may be coupled directly to the destination node 102.

The source node 101 and the destination node 102 may be any devices, components, or apparatuses that are configured to communicate at network Layer 1, such as by exchanging a plurality of symbols or bits. The source node 101, destination node 102, and the transit node 103 may also be configured to transfer packets or frames, e.g. Ethernet or Internet Protocol (IP) packets, at higher network layers, such as a link layer or layer two (layer 2). For example, the source node 101, the destination node 102, and the transit node 103 may include bridges, switches, routers, or various combinations of such devices. The nodes may comprise a plurality of ingress ports or units for receiving packets from other nodes, logic circuitry to determine which nodes to send the packets to, and a plurality of egress ports or units for transmitting frames to the other packets.

The Layer 1 communications between the source node 101 and the destination node 102 may be transparent to the transit node 103. For instance, the transit node 103 may be a repeater or retransmission node that forwards the symbols or bits at Layer 1 between the source node 101 and the destination node 102 without processing the symbols or bits and without being aware of the Layer 1 communications content.

The source node 101 may comprise a first forwarding PHY unit 110, and the destination node 102 may comprise a second forwarding PHY unit 120, which may be substantially similar to the first forwarding PHY unit 110. Further, the first forwarding PHY unit 110 may comprise a source queue 112 and/or the second forwarding PHY unit 120 may comprise a destination queue 122. The second forwarding PHY unit 120 may also comprise a loop-back (LB) unit 124. The components of the source node 101 and the destination node 102 may be arranged as shown in FIG. 1 and may be implemented using hardware, software, or both.

The first forwarding PHY unit 110 may be configured to transmit at least one symbol, which may comprise one or a plurality of bits, to the destination node 102. The symbol may be a specific symbol that is recognized by both the source node 101 and the destination node 102 and used for Layer 1 transmission synchronization. The symbol may also indicate or comprise the transmission time of the symbol from the source node 101, e.g. based on a local clock in the source node 101 (not shown) or an absolute clock of the network. The quantity of forwarded symbols may be sufficient to introduce a virtual delay between the source node 101 and the destination node 102. The quantity of symbols and thus the virtual delay may be predetermined, such as based on network parameters and/or network topology. The symbol(s) may be forwarded from the source node 101 by the transit node 103, at Layer 1, to the destination node 102. Alternatively, the symbols may be forwarded directly, e.g. at Layer 0 using a regenerator or an amplifier, to the destination node 102.

The symmetrical virtual delay may correspond to a maximum expected equal half round-trip delay between the two nodes in both the forward direction (D1) and the reverse direction (D3). For instance, the half round-trip delays may be about equal in both directions if the channel bandwidths (e.g. for upstream and downstream channels) and thus the latencies in both direction between the nodes are about the same. The maximum expected half round-trip delay may comprise any anticipated fixed and/or variable span delays in both the forward and reverse directions. The maximum expected half round-trip delay may comprise any of a plurality of delay sources. For example, the delays may include source PHY delays (for propagation and/or adjustment), span delays (both fixed and variable), transit node/network delays (along the transit node(s) 103), destination PHY delays (for propagation and/or adjustment), or combinations thereof.

The second forwarding PHY unit 120 may be configured to receive the symbols, process the symbols internally, e.g. in the LB unit 124, and loop back the symbols to the source node 101. The second forwarding PHY unit 120 may calculate a delay (D2) after processing the symbols in the LB unit 124. The delay D2 may be about equal to the difference between the transmission time indicated in the symbols and a retransmission time at which the symbols are looped back. The retransmission time may be obtained from a local clock in the destination node 102 (not shown) or an absolute clock of the network. The second forwarding PHY unit 120 may add D2 to the symbols before returning the symbols to destination node 101, e.g. after processing the entire sequence of symbols.

The first forwarding PHY unit 110 may receive the looped back symbols for the destination node 102, directly or via the transit node 103, and forward and process the symbols internally to introduce an internal delay substantially equal to D2. The first forwarding PHY unit 110 may calculate a total delay (D4) after processing the looped back symbols. The total delay may be about equal to the sum of D1, D3, and the internal delays in the destination node 102 and the source node 101, e.g. about equal to the difference between the initial transmission time indicated in the symbols and a local time after processing the looped back symbols. The local time may be obtained from the local clock in the source node 101 (not shown) or the absolute clock. The first forwarding PHY unit 110 may then use D4 and D2 to estimate or derive a virtual delay (for symmetrical span delays) between the two nodes, such as according to equation:

$$D1=D3=(D4-D2)/2.$$

Accurately calculating the half round-trip delays between two nodes may be needed to achieve accurate time alignment, e.g. frequency and/or phase time alignment, between the two nodes. For instance, the two nodes may use the accurate estimate of the half round-trip delay to synchronize their corresponding local clock times, synchronize their corresponding times with an absolute clock timing for the entire network, or both. The scheme may also be implemented between a plurality of pairs of nodes, such as in network timing and distribution scheme for geographically distributed networks.

The above scheme is based on the assumption of symmetrical span delays (in both directions) and may not provide accurate delay information if the trip delays in the forward direction and the reverse direction are substantially different. For instance, if the upstream and downstream channel bandwidths and thus the corresponding latencies are not equal, such as in the case of typical PONs, the above scheme may not be sufficient to allow accurate transmissions synchronization between the two nodes. In this case, a second scheme may be implemented, where the source node 101 may use the SQ 112 and the destination node 102 may use the destination queue (DQ) 122 to queue the symbols, and thus introduce about the same virtual delay in both directions. The virtual delay may be greater than a maximum expected delay for both directions. The quantity of symbols and thus the virtual delay may be predetermined, such as based on network parameters and/or network topology, or may be estimated using the first scheme described above.

In another embodiment, the destination node 102 may use the DQ 122 or the source node 101 may use the SQ 112 to queue the symbols and thus extend the delay in one of the two directions to match the delay for both directions. For instance, if the reverse direction delay is expected to be greater than forward direction delay, e.g. when the upstream channel bandwidth is smaller than the upstream channel bandwidth, the first forwarding PHY 110 unit may use the SQ 112 to queue the looped back symbols and thus extend the delay in the reverse direction. As a result, the effective delays in both directions D1 and D3 may be about the same. Alternatively, the two nodes may use different size queues to queue the symbols, and thus add different delays in the two directions to match the half round-trip delays in both directions. For instance, the second forwarding PHY unit 120 may use the DQ 122 and the first forwarding PHY unit node 110 may use the SQ 112, which may have larger size than the DQ 122, to queue the symbols and introduce about equal virtual delays in the two directions. As such, the second forwarding PHY unit 120 may queue a subset of the symbols that are queued by the first forwarding PHY unit 110 to cause an about equal virtual delay in both directions.

In some embodiments, the destination node 102 may also be configured to act as a source node similar to the source node 101, and as such may comprise a SQ substantially similar to the SQ 112. Thus, the destination node 102 may implement the first scheme (in the case of symmetrical span delays) or the second scheme (in the case of asymmetrical span delays) to synchronize transmissions with a second destination node (not shown), which may be coupled to the destination node 102 directly or via at least one transit node 103.

The schemes above may be used to achieve substantially accurate transmissions synchronization and frequency alignment between the nodes, for example without modifying the network topology and/or causing substantial traffic congestion. The schemes may also be used to achieve sufficiently accurate phase alignment between the nodes, e.g. if a sufficient quantity of symbols are exchanged within a sufficiently reduced time period. The first scheme or the second scheme may be repeated, e.g. periodically or when needed, to maintain transmissions synchronizations between the nodes continuously or over relatively long periods of time.

Figure 2:
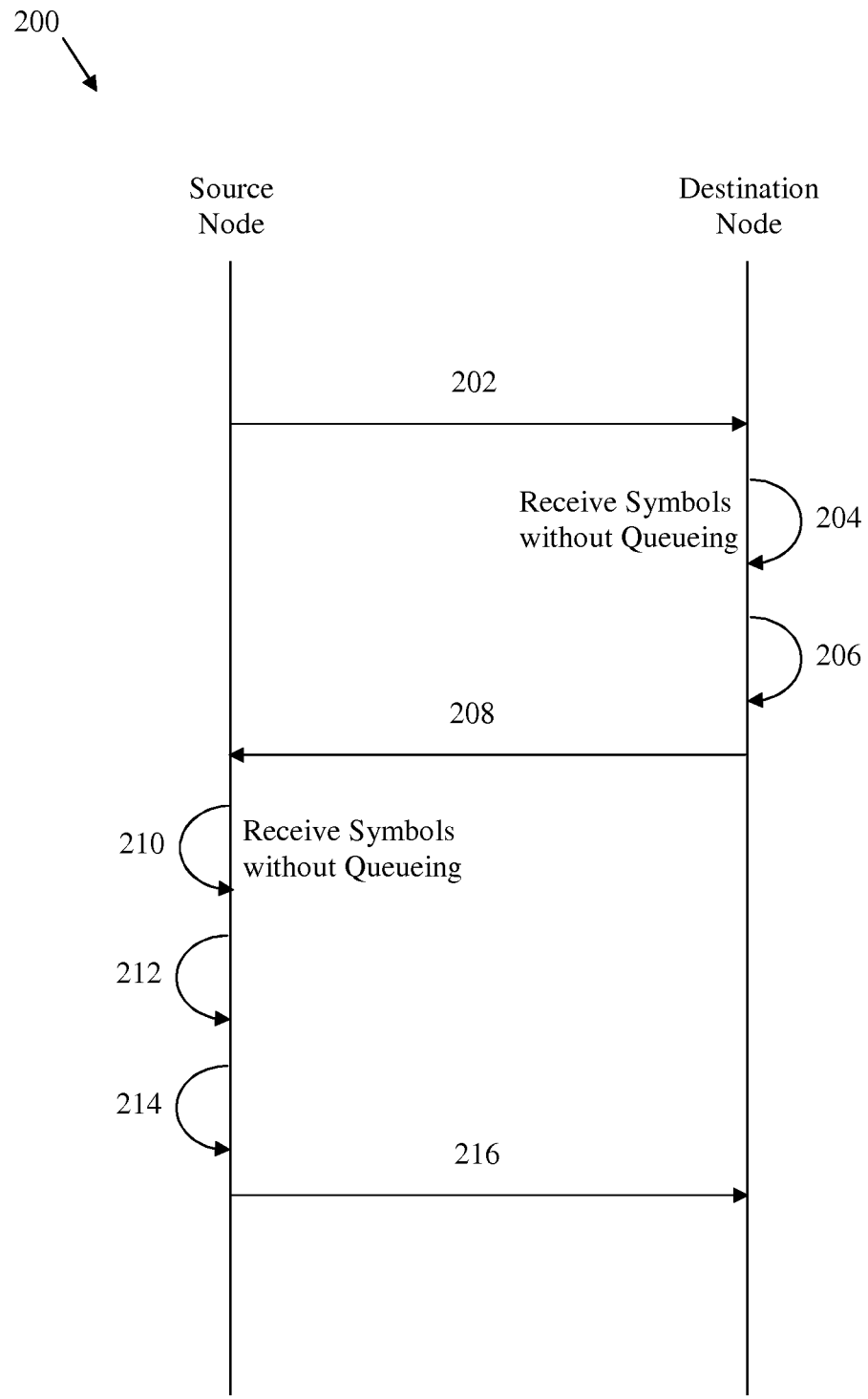
FIG. 2 is a protocol diagram of an embodiment of a transfer delay compensation sequence.

FIG. 2 illustrates an embodiment of a transfer delay compensation sequence 200 that may be used in the transfer delay compensation system 100. Specifically, the transfer delay compensation sequence 200 may be implemented to account for about equal span delays in both the forward and reverse directions between a source node and a destination node, such as in the case of symmetrical span delays.

At step 202, the source node may send a plurality of symbols in sequence to the destination node. For example, the source node 101 may send a quantity of symbols, which may be predetermined, to the destination node 102 directly or via at least one transit node 103. Each symbol may comprise a plurality of symbols that may be recognized by the destination node as part of a sequence that is used for transmissions synchronization in a loop-back scheme. Each symbol may also comprise a corresponding transmission time, e.g. according to a local clock in the source node. The determined quantity of the transmitted symbols may have a total delay that exceeds any expected delay in the forward direction from the source node to the destination node.

At step 204, the destination node may receive the symbols, e.g. at a forward time delay (e.g. D1) that corresponds to the virtual delay. The forward time delay may correspond to the time span from sending the symbols from the transmitter unit in the source node (e.g. first forwarding PHY unit 110) to receiving the symbols at a receiver unit in the destination node (e.g. second forwarding PHY unit 120). At step 206, the destination node may process the symbols to calculate a delay for the symbols (e.g. D2). For instance, the destination node may process each symbol to calculate a corresponding delay or process the first or last symbol to calculate a delay for all the symbols. The destination node may process each received symbol one by one as each is received, e.g. without queuing the symbols. The delay may correspond to the combined time for forwarding the symbols (e.g. D1) and processing the symbols at the destination node.

At step 208, the destination node may return (e.g. loop back) the symbols and the calculated internal delay to the source node. The destination node may add to the symbols the calculated delay for all the symbols or may add to each symbol a corresponding calculated delay before returning the symbols. At step 210, the source node may receive the returned symbols, e.g. at a return time delay (e.g. D3) that corresponds to the virtual delay and is about equal to the forward time delay (e.g. D1). The return time delay may correspond to the time span from returning the symbols from the transmitter unit in the destination node (e.g. second forwarding PHY unit 120) to receiving the symbols at a receiver unit in the receiver node (e.g. first forwarding PHY unit 110).

At step 212, the source node may process the symbols to calculate a total delay for the symbols (e.g. D4). For instance, the source node may process each symbol to calculate a corresponding total delay or process the first or last symbol to calculate a total delay for all the symbols. The source node may process each looped back symbol one at a time, e.g. without queuing the symbols. The total delay may correspond to the overall time from initially transmitting the symbols from the source node to processing the received looped back signals in the source node.

At step 214, the source node may calculate the half round-trip delay for both the forward and reverse directions, which may be about the same (e.g. D1 and D3). The half round-trip delay may be about equal to half the difference between the delay D2 calculated by the destination node and indicated in the looped back symbols and the total delay D4 calculated by the source node. The source node may calculate a half round-trip for all the symbols based on D2 and D4 for all the symbols or an average half round-trip for all the symbols based on D2 and D4 for each symbol. At step 216, the source node may inform the destination node of the half round-trip delay. Thus, both nodes may use the estimated half round-trip delay to synchronize the clocks and achieve frequency and/or phase alignment.

Figure 3:
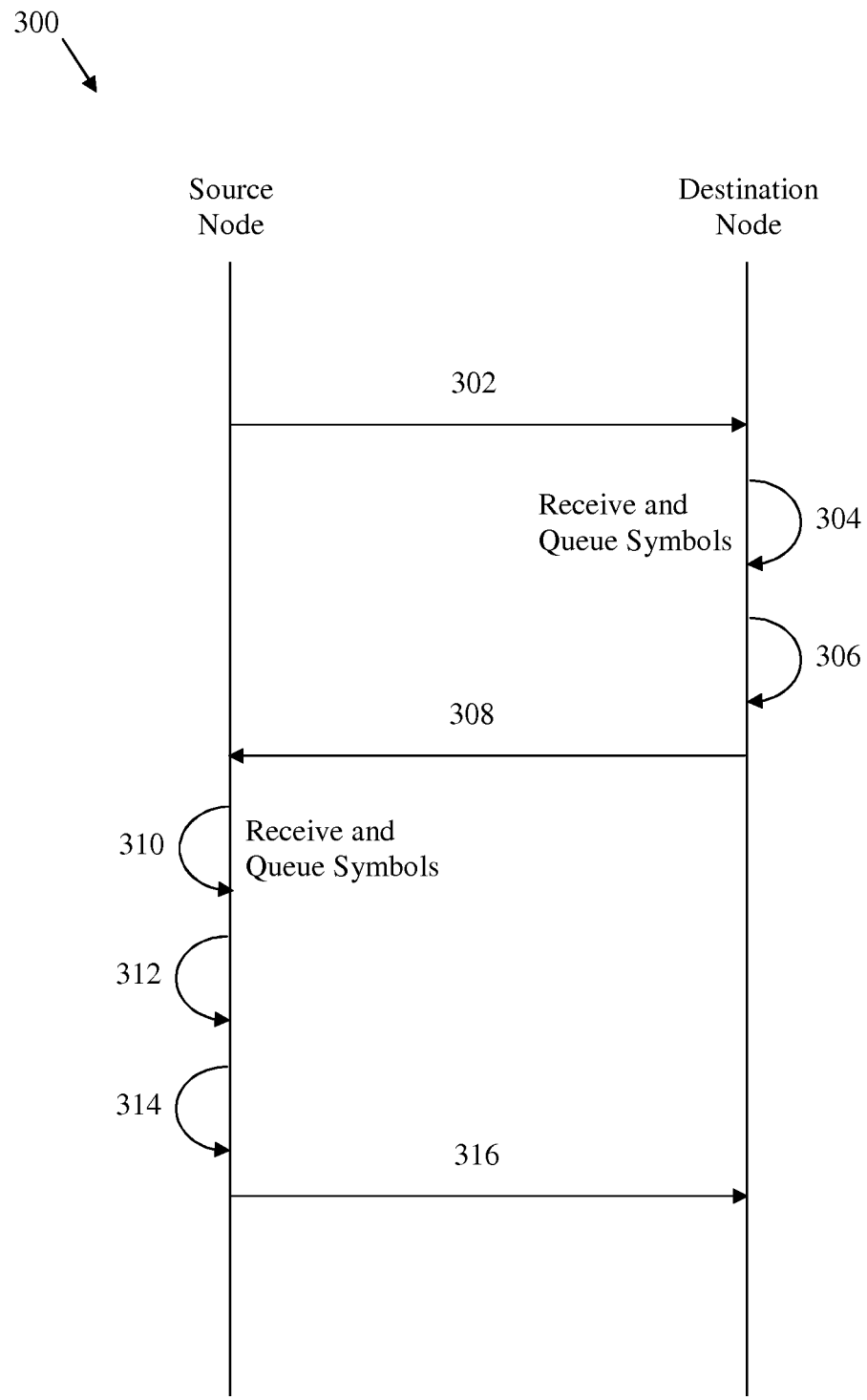
FIG. 3 is a protocol diagram of another embodiment of a transfer delay compensation sequence.

FIG. 3 illustrates an embodiment of another transfer delay compensation sequence 300 that may be used in the transfer delay compensation system 100. Specifically, the transfer delay compensation sequence 300 may be implemented to account for different span delays in the forward and reverse directions between a source node and a destination node, such as in the case of asymmetrical span delays. For example, the transfer delay compensation sequence 300 may be implemented to estimate a half round-trip delay for variable bandwidth upstream and downstream channels between an optical line terminal (OLT) and an optical network unit (ONU) in a passive optical network (PON). The half round-trip delay may correspond to a virtual delay that exceeds expected delays in both the upstream and downstream channels. In another embodiment, the transfer delay compensation sequence 300 may be implemented to estimate a half round-trip delay for between a very high bit rate DSL (VDSL) transceiver unit at a central office (VTU-O) and a VDSL transceiver unit at a residential location (VTU-R).

At step 302, the source node may send a plurality of symbols in sequence to the destination node, e.g. in a manner similar to step 202. Additionally, the quantity of symbols may be determined based on a previously estimated half round-trip between the source node and the destination node using the transfer delay compensation system 100. The quantity of symbols may be determined to match or exceed the previously estimated half round-trip delay (based on a symmetrical span delay assumption).

At step 304, the destination node may receive and queue the symbols, e.g. to introduce a virtual delay that exceeds a maximum delay of both the forward and reverse directions. For example, the destination node 102 may receive and queue each one of the transmitted symbols from the source node 101 in the DQ 122 until all the symbols are received and queued. As such, the virtual delay time may correspond to the combined time of forwarding and queuing all the symbols. At step 306, the destination node may process the queued symbols to calculate a delay for the symbols (e.g. D2). For instance, the destination node may process each queued symbol to calculate a corresponding delay or process the first or last queued symbol to calculate a delay for all the symbols.

At step 308, the destination node may return (e.g. loop back) the symbols and the calculated internal delay to the source node. The destination node may add to the symbols the calculated delay for all the symbols or may add to each symbol a corresponding calculated delay before returning the symbols. At step 310, the source node may receive and queue the returned symbols, e.g. a virtual delay that is about equal to the delay in the forward direction. For example, the source node 101 may receive and queue each one of the returned symbols from the destination node 102 in the SQ 112 until all the symbols are received and queued. As such, the virtual delay time may correspond to the combined time of returning and queuing all the symbols.

At step 312, the source node may process the queued symbols to calculate a total delay for the symbols (e.g. D4). For instance, the source node may process each queued symbol to calculate a corresponding total delay or process the first or last queued symbol to calculate a total delay for all the symbols. At step 314, the source node may calculate the half round-trip delay for both the forward and reverse directions, which may be about the same (e.g. D1 and D3). The half round-trip delay may be about equal to half the difference between the delay D2 calculated by the destination node and indicated in the looped back symbols and the total delay D4 calculated by the source node. The source node may calculate a half round-trip for all the symbols based on D2 and D4 for all the symbols or an average half round-trip for all the symbols based on D2 and D4 for each symbol.

At step 316, the source node may inform the destination node of the half round-trip delay. Thus, both nodes may use the estimated half round-trip delay to synchronize the clocks and achieve frequency and/or phase alignment. In other embodiments of the transfer delay compensation sequence 300, only one of the two nodes may queue the received symbols or both nodes may queue different quantity of the symbols to introduce effectively about equal delays in the forward and reverse directions.

Figure 4:
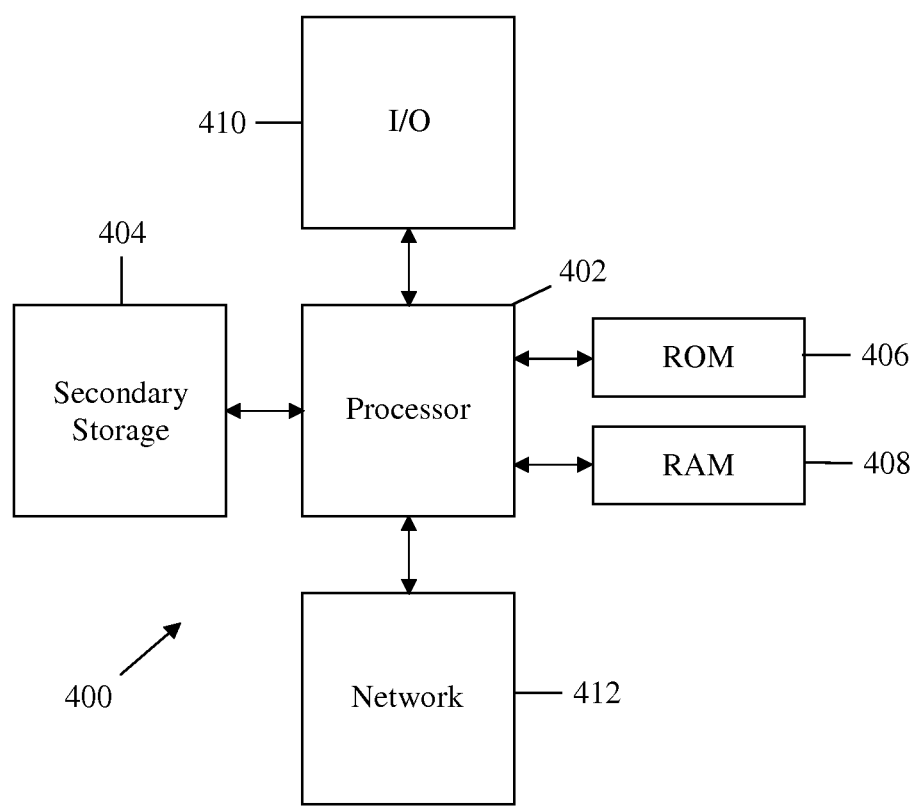
FIG. 4 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 4 percent, . . . , 40 percent, 41 percent, 42 percent, . . . , 94 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims.

Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a forwarding physical layer (PHY) unit comprising a source queue (SQ),
   wherein the forwarding PHY unit is configured to measure a one-way physical layer delay between the forwarding PHY unit and a destination node,
   wherein the SQ is configured to set a virtual delay between the forwarding PHY unit and the destination node, and
   wherein the virtual delay is determined using the measured one-way physical layer delay.

2. The network component of claim 1, wherein the destination node comprises a second forwarding PHY unit comprising a destination queue (DQ) and a loop-back (LB) unit, wherein the virtual delay is set to match or exceed the one-way physical layer delay, and wherein the virtual delay is an extension of the one-way physical layer delay.

3. The network component of claim 2, wherein the SQ is further configured to queue a plurality of symbols, wherein the symbols queued within the SQ are Open Systems Interconnection (OSI) layer 1 symbols, and wherein the forwarding PHY unit is further configured to process the symbols from the SQ to measure a one-way physical layer delay, and wherein the measured one-way physical layer delay is used to synchronize a clock within the network component.

4. The network component of claim 2, wherein the forwarding PHY unit and the second forwarding PHY unit are coupled to each other via a forward path and a reverse path, and wherein the virtual delay exceeds a delay of the forward path.

5. The network component of claim 4, wherein forward path has a greater bandwidth than the reverse path, and wherein the virtual delay exceeds a delay of the reverse path.

6. The network component of claim 5, wherein the size of the DQ is greater than the size of the SQ, wherein the delay of the reverse path exceeds the delay of the forward path, and wherein the virtual delay is set as the delay of the reverse path and the delay of the forward path.

7. The network component of claim 2, wherein the forwarding PHY unit and the second forwarding PHY unit are coupled to each other via a transit node.

8. The network component of claim 1, wherein the SQ is further configured to receive a predetermined number of symbols and queue the symbols, wherein a time period to receive and queue the symbols is used to set the virtual delay, and wherein the number of symbols are used to set the virtual delay.

9. A network component comprising:
   a forwarding physical layer (PHY) unit configured to send a plurality of symbols at a network physical layer to a destination node and receive the symbols at a network physical layer from the destination node; and
   a source queue (SQ) configured to queue the symbols returned from the destination node,
   wherein the forwarding PHY unit is further configured to process the queued symbols to calculate a half round-trip delay based on a virtual delay time, and
   wherein the virtual delay time is a predetermined time period used to set the delay between PHY unit and the destination node.

10. The network component of claim 9, wherein the half round-trip delay is equal to about half the difference between a total loop-back trip delay for the symbols and a forward trip delay for the symbol to the destination node.

11. The network component of claim 10, wherein the forward trip delay for the symbol to the destination node is calculated by the destination node and indicated to the forwarding PHY unit, and wherein the total loop-back trip delay for the symbols is calculated by the forwarding PHY unit.

12. The network component of claim 11, wherein the symbols sent to the destination node indicate an initial transmission time from the forwarding PHY unit, wherein both the forward trip delay and the total loop-back trip delay are calculated based on the initial transmission time, and wherein the forwarding PHY unit is configured to calculate the total loop-back trip delay by processing each of the queued symbols.

13. The network component of claim 9, wherein the virtual delay time is determined by the quantity of symbols forwarded to the destination node, and wherein the virtual delay time is set to exceed any anticipated fixed or variable half round-trip delay, and wherein the quantity of symbols is set using at least one of the following conditions: one or more network parameters and a network topology.

14. The network component of claim 9, wherein the symbols are queued by the destination node to match a reverse trip delay for the symbols transmitted from the destination node to the network component with the virtual delay time due to sending the symbols to the destination node, wherein the network component further comprises a clock, and wherein the half round-trip delay is used to synchronize the clock with a local clock associated with the destination node.

15. The network component of claim 9, wherein a forward trip delay for traffic other than the symbols from the forwarding PHY unit to the destination node is substantially different to a reverse trip delay for the traffic from the destination node to the forwarding PHY unit, and wherein a previous half round-trip delay is used to determine the virtual delay time.

16. A method for supporting transmission synchronization between a source node and a destination node, wherein the method comprises:

receiving a plurality of Open System Interconnection (OSI) layer one symbols from the node;
queuing the received OSI layer one symbols;
returning the received OSI layer one symbols to the source node;
receiving a half round-trip delay indication from the source node; and
synchronizing a clock based on the half round-trip delay indication,
wherein the number of OSI layer one symbols received are predetermined, and
wherein the number of OSI layer one symbols is used to set a virtual delay time between the source node and the destination node.

17. The method of claim 16 further comprising:
queuing the symbols received from the source node;
calculating a delay time for the symbols based on a transmission time of the symbols from the source node and a retransmission time of the symbols that indicates when the symbols are transmitted back to the source node; and
adding the calculated delay time to the symbols when transmitted back to the source node.

18. The method of claim 17, wherein queuing the received symbols before returning the symbols contributes to the virtual delay time from the source node, and wherein each received symbol indicates the corresponding transmission time from the source node.

19. The method of claim 17, wherein the returned nodes are queued at the source node and then processed to calculate a total delay time from the time of transmitting the symbols from the source node, and wherein queuing the received symbols before returning the symbols introduces about the same virtual delay time to the source node.

20. The method of claim 17, wherein the number of OSI layer one symbols are determined using at least one of the following ways: a previous half round-trip delay, one or more network parameters, and a network topology, and wherein the virtual delay exceeds a maximum expected delay between the source node and the destination node.

* * * * *

UNITED STATES PATENT AND TRADEMARK OFFICE
CERTIFICATE OF CORRECTION

PATENT NO. : 8,547,864 B2
APPLICATION NO. : 12/910387
DATED : October 1, 2013
INVENTOR(S) : Serge Francois Fourcand Page 1 of 1

It is certified that error appears in the above-identified patent and that said Letters Patent is hereby corrected as shown below:

In the Claims

Column 9, Line 63 should read: "5. The network component of claim 4, wherein the forward"

Column 10, Line 1 should read: "the reverse path exceeds the delay of the forward path, and"

Signed and Sealed this
Twelfth Day of November, 2013

Teresa Stanek Rea
*Deputy Director of the United States Patent and Trademark Office*